(12) United States Patent
Tsuchiyama et al.

(10) Patent No.: US 6,245,314 B1
(45) Date of Patent: Jun. 12, 2001

(54) CALCIUM SULFIDE OXIDATION METHOD

(75) Inventors: Yoshihiko Tsuchiyama; Yuichi Fujioka; Toshihiko Setoguchi; Katsuhiko Shinoda; Kenji Tagashira; Shigeyasu Ishigami; Yoshinori Kobayashi, all of Nagasaki (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 09/140,657

(22) Filed: Aug. 26, 1998

(30) Foreign Application Priority Data

Aug. 29, 1997 (JP) .................................................. 9-234063

(51) Int. Cl.$^7$ .................................................. C01F 11/46
(52) U.S. Cl. .................................. 423/555; 423/DIG. 16
(58) Field of Search .............................. 423/555, DIG. 16

(56) References Cited

U.S. PATENT DOCUMENTS

| 4,249,472 | 2/1981 | Mitchell | 110/245 |
| 4,594,967 | 6/1986 | Wolowodiuk | 122/4 D |

FOREIGN PATENT DOCUMENTS

| 0 042 638 A1 | * 12/1981 | (EP) | 423/555 |
| 2-282601 | 4/1989 | (JP) | |
| 2-290402 | 4/1989 | (JP) | |
| 07332612 | 12/1995 | (JP) | |
| 09025121 | 1/1997 | (JP) | |

* cited by examiner

Primary Examiner—Steven P. Griffin
Assistant Examiner—Timothy C Vanoy
(74) Attorney, Agent, or Firm—Wenderoth, Lind & Ponack, L.L.P.

(57) ABSTRACT

CaS oxidation has CaS particles oxidized into $CaSO_4$ completely as far as to the interior of the particle. The interior of an oxidation apparatus 1 is partially partitioned by a partition 22 to thereby form a first fluidized bed 20 on the inner side, a second fluidized bed 21 on the outer side and a space portion 23 thereabove. A heat exchanger 27 having a baffle plate is disposed on the inner side of the partition 22 and an in-bed heat exchanger 33 is disposed on the outer side of same. A desulfurizing product-containing fine powder 204 and coarse powder 205 and a mixture gas 206 of nitrogen, oxygen and steam are supplied into the second fluidized bed 21. Also, coal 200 and coal char 201 are supplied into the first fluidized bed 20 from below. Of the particles 304 oxidized in the second fluidized bed 21 and supplied into the first fluidized bed 20 from below with the flow of a mixture gas 208, the fine powder entrains into the space portion 23 as entrained particles 300 and a major part thereof falls down into the second fluidized bed 21 as particles 207. The completely oxidized particles are discharged as discharged ash 303 and entrained ash 302.

4 Claims, 10 Drawing Sheets

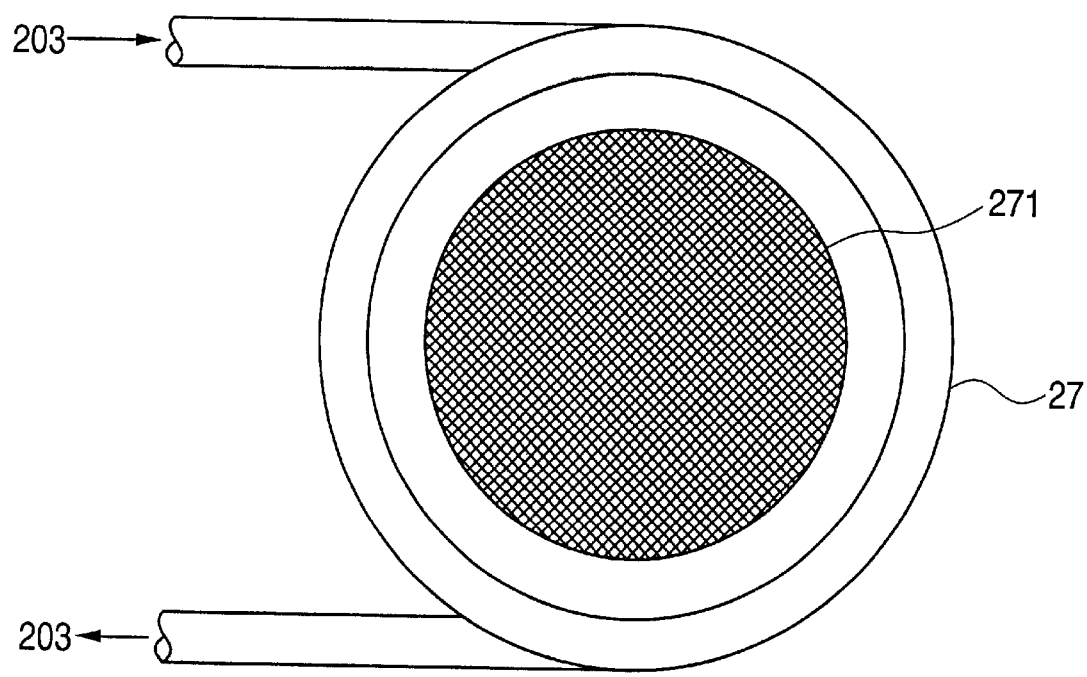

CALCIUM SULFIDE OXIDATION METHOD

BACKGROUND OF THE INVENTION

1. Field of the Invention

The present invention relates to a calcium sulfide oxidation method and apparatus for oxidizing calcium sulfide (CaS) generated at a power plant, etc., to thereby obtain calcium sulfate ($CaSO_4$).

2. Description of the Prior Art

One example of a prior art oxidation apparatus for oxidizing CaS generated at a power plant, etc., into $CaSO_4$ is shown in FIG. 10. In FIG. 10, numeral 1 designates an oxidation apparatus, numeral 1A designates a fluidized bed formed therein and numeral 1A designates a plenum. Numeral 6 designates a heat exchanger disposed in the oxidation apparatus 1, numeral 7 designates a cyclone and numeral 8 designates a particle distributor.

Numeral 9 designates a distributor plate disposed at a bottom portion of the oxidation apparatus 1. On this distributor plate 9, the fluidized bed 1A is formed, and limestone particles 100 containing char and CaS are supplied into the fluidized bed 1A through a nozzle 2. A mixture gas 101 of oxygen, steam and nitrogen is supplied into the plenum 1D through a nozzle 3. The mixture gas 101 is supplied into the fluidized bed IA via the distributor plate 9 to vigorously effect a mixture combustion of the particles 100 in the fluidized bed 1A.

The oxygen concentration of a combustion gas 103 coming out of the fluidized bed 1A is set to 3 to 4% or more. Unless the oxygen concentration of 3 to 4% or more is maintained, it will be difficult to burn the char constantly. In the fluidized bed 1A, there occurs a reaction of $CaS+2O_2 \rightarrow CaSO_4$ between CaS and oxygen in the gas. While a large proportion of CaS is converted to $CaSO_4$ as a whole in the fluidized bed 1A, CaS remains still within the particles.

The heat exchanger 6 is disposed in the fluidized bed 1A so that heat of the particles in the fluidized bed 1A is collected and a heating medium fluid 107 flowing in the heat exchanger 6 is heated. Combustion gas 108 coming out of the oxidation apparatus 1 enters the cyclone 7 to be separated into a dedusted combustion gas 109 and collected particles 110. The 30 collected particles 110 are distributed by the particle distributor 8 into fine powder particles 111 to be extracted outside the system and coarse particles 112 to be returned into the fluidized bed 1A.

The coarse particles 112 are supplied into the fluidized bed 1A via a nozzle 5.

Coarse particles 102, an ash content of the char, which are not pulverized in the fluidized bed 1A, but remain there so as not to be elutriated by the gas 103, are extracted outside the system via a nozzle 4 which is fitted to the distributor plate 9.

In the prior art apparatus as described above, there is contained in the particles 111 and 102 extracted outside the system a high concentration of CaS which has not been converted into $CaSO_4$. This high concentration CaS contained in the particles 111 and 102 is gradually decomposed in the air to generate $H_2S$, which results in the problem of an unfavorable influence being given to the environment.

Two reasons are considered why CaS remains in the particles discharged from the prior art oxidation apparatus. Firstly, $CaSO_4$ generated on a particle surface at an initial stage of reaction forms a dense shell, so that oxygen is not supplied into the interior of the particle and CaS therein cannot react with oxygen. $CaSO_4$, as compared with CaS, has a molecular volume of 1.8 times as larger, and as the reaction proceeds from CaS into $CaSO_4$, gas diffusion pores existing in the particle clog, and oxygen cannot be supplied into the interior of the particle.

Secondly, a fine powder begins to entrain from the fluidized bed before ensuring sufficient reaction time required for complete oxidation of CaS, is discharged outside the oxidation apparatus as CaS contained in the fine powder, and is not yet completely oxidized.

Also, in case the fuel supply rate varies, because it is necessary to maintain the temperature and gas flow velocity in the fluidized bed within an appropriate range, it is preferable to change the heat transfer rate of heat transferred to the heating medium through the heat exchanger in the fluidized bed corresponding to the fuel supply rate.

In the prior art, however, it has been difficult to greatly change the heat transfer rate unless the height of the fluidized bed is changed. Further, in changing the fluidized bed height, it is necessary to put in or take out fluid medium to or from the fluidized bed, which work requires a great amount of time, and there has been a problem in that variations in the fuel supply rate cannot be followed well.

SUMMARY OF THE INVENTION

In view of the shortcomings in the prior art, as described with respect to the apparatus shown in FIG. 10, it is an object of the present invention to provide a CaS oxidation method and apparatus for oxidizing CaS into $CaSO_4$ by which CaS particles can be oxidized into $CaSO_4$ completely, as far as to the interior of the particle.

It is also an object of the present invention to provide an operation method of the CaS oxidation apparatus according to the present invention by which CaS can be efficiently oxidized into $CaSO_4$.

In order to attain the object, the present invention provides the following oxidation method using an oxidation apparatus forming therein a first fluidized bed, a second fluidized bed on an outer side of the first fluidized bed and a space portion above the two fluidized beds.

That is, CaS-containing particles fluidized by a gas flow in the first fluidized bed are caused to collide violently with a heat exchanger or a baffle plate, disposed in the oxidation apparatus so as to traverse the gas flow. Accordingly, a dense shell of $CaSO_4$ generated on a surface of the particle is abraded and oxygen is spread as far as to the interior of the particle to thereby accelerate an oxidation reaction of CaS into $CaSO_4$. The baffle plate has no heat exchange function and has a surface coating applied thereto made of a material of a hardness higher than that of a fluid medium.

Further, a flow velocity in the space portion above the first fluidized bed is set to a terminal flow velocity or less of a fine powder entraining from the first fluidized bed to thereby cause the entraining fine powder soaring into the freeboard portion from the first fluidized bed to fall down into the second fluidized bed disposed on the outer side of the first fluidized bed.

Also, a gas flow velocity in the second fluidized bed is set lower than that in the first fluidized bed so that the fine powder that has fallen down into the second fluidized bed may not be entrained again. A volume of the second fluidized bed is set such that a particle residence time in the second fluidized bed becomes the value (or more) as calculated to a time required for complete oxidation of the fine powder, and the fine powder, containing CaS, which has been supplied from outside of the oxidation apparatus is supplied into the second fluidized bed.

Furthermore, an abrasion rate of the shell of $CaSO_4$ in the first fluidized bed is controlled by a gas flow velocity in the first fluidized bed and an in-bed fill of the heat exchanger and baffle plate.

According to the CaS oxidation method described above, CaS is supplied into the second fluidized bed to be oxidized and is then sent to the first fluidized bed. In the first fluidized bed, CaS particles collide with the heat exchanger or baffle plate and the shell of $CaSO_4$ generated on the surface of CaS particle is pulverized and abraded so that CaS particles are accelerated to be oxidized into $CaSO_4$ as far as to the interior of the particle.

CaS particles so accelerated to be oxidized in the first fluidized bed soar into the space portion from the first fluidized bed and then fall down into the second fluidized bed, so that the CaS particles are oxidized into $CaSO_4$ completely with a lower gas flow velocity and with sufficient time.

According to the CaS oxidation method of the present invention, CaS particles can be oxidized completely as far as to the interior of the particle and CaS can be prevented from being discharged outside the system.

Also, in order to attain the object, the present invention provides an oxidation apparatus of the following construction.

That is, the CaS oxidation apparatus according to the present invention is an oxidation apparatus that forms therein a first fluidized bed, a second fluidized bed on an outer side of the first fluidized bed and a space portion above the two fluidized beds, and comprises therein a partition for partially partitioning an interior of the oxidation apparatus into an inner side and an outer side.

The first fluidized bed is constructed on the inner side of the partition such that a heat exchanger or baffle plate is disposed in the first fluidized bed and particles received from the second fluidized bed on the outer side via a hole disposed below the partition are fluidized by an oxygen-containing oxidizing gas of air, oxygen or the like blown through a nozzle. At the same time, while a fuel of coal, coal char or the like supplied through a nozzle is burnt and CaS contained in the particles is oxidized, the particles are pulverized and abraded by the heat exchanger or baffle plate and a pulverized and abraded fine powder is sent to the freeboard portion, and a completely oxidized coarse powder is discharged outside the oxidation apparatus.

Also, the second fluidized bed is constructed on the outer side of the partition such that a desulfurizing agent of limestone, dolomite or the like supplied via a particle supply pipe and CaS contained in the particles that have fallen down from the space portion are fluidized to be oxidized into $CaSO_4$ by an oxygen-containing oxidizing gas of air, oxygen or the like supplied via a nozzle.

Further, the space portion is constructed above the first fluidized bed and second fluidized bed such that a major part of the fine powder entrained from the first fluidized bed is caused to fall down into the second fluidized bed. Remaining particles are elutriated by a gas from the first fluidized bed and second fluidized bed to be discharged outside the oxidation apparatus.

The outer side of the partition where the second fluidized bed is formed is constructed by a portion where a heat exchanger for temperature control is disposed and a portion where no such heat exchanger is disposed.

According to the present invention, the CaS oxidation apparatus is partitioned in its interior into the inner side and the outer side, the first fluidized bed is formed on the inner side, the second fluidized bed is formed on the outer side and the particles which have been oxidized in the first fluidized bed on the inner side and entrained into the space portion thereabove fall down from the space portion into the second fluidized bed on the outer side to be completely oxidized there, and are then sent to the first fluidized bed to be extracted to the outside. In the first fluidized bed, the particles collide with the heat exchanger or baffle plate disposed in the first fluidized bed to be pulverized and abraded, and oxidation as far as to the interior of the particle is accelerated.

In the CaS oxidation apparatus according to-the present invention, it is preferable for accelerating oxidation of particles containing less fine powder to make a height of the partition lower than that of a fluidized bed of the first and second fluidized beds, respectively.

That is, in case where a proportion of fine powder in the particles to be treated is small so that it is difficult to follow a partial load, a particle circulation rate of the particles moving into the second fluidized bed from the first fluidized bed over the partition can be increased.

Also, in the CaS oxidation apparatus according to the present invention, it is preferable for accelerating oxidation of the particles containing less fine powder to employ a construction such that a supply pipe of fuel of coal, coal char or the like is disposed on the outer side of the partition to thereby supply the fuel into the second fluidized bed on the outer side via a nozzle or, in addition thereto, a construction such that nozzles for supplying gas therethrough are distributed irregularly in the radial direction on the inner side of the partition.

That is, if the fuel is supplied into the second fluidized bed through a nozzle disposed on the outer side of the partition, then the second fluidized bed becomes a reduction atmosphere and CaO generated in the particle surface in that reduction atmosphere cause fine pores in the particle surface. Thus oxygen becomes liable to be spread through the fine pores as far as to the interior of the particle, and oxidation to the interior of the particle is accelerated.

Also, in addition to supplying the fuel on the outer side of the partition, nozzles for supplying the gas on the inner side of the partition are distributed irregularly in the radial direction to thereby form a portion of a reduction atmosphere in the radial direction below the first fluidized bed. CaO is then generated in the particle surface to thereby accelerate oxidation as far as to the interior of the particle, as mentioned above, in the first fluidized bed as well.

In the CaS oxidation apparatus according to the present invention, it is preferable for an efficient oxidation of CaS particles to do the following operation.

That is, a mean particle size of CaS-containing desulfurizing agent to be supplied is set in a range of 300 to 2000$\mu$m, firstly. Also, in order to control abrasion of the particles in the first fluidized bed, a fill of a heat exchanger or a baffle plate which has no heat exchange function is changed, and a gas flow velocity is changed to a range of 0.5 to 1.5 m/s. Further, a gas flow velocity in the second fluidized bed is set to a range of 0 to 1.2 m/s so as not to cause the pulverized particles to be entrained therein. A gas flow velocity in the space portion is changed to a range of 0.1 to 0.3 m/s to thereby control the amount entrained outside of the system. Also, the gas flow velocity in the first fluidized bed, the gas flow velocity in the second fluidized bed and the gas flow velocity in the space portion are changed to control a particle circulation rate from the first fluidized bed into the second fluidized bed. Further, in order to control a heat absorption rate of the entire CaS oxidation apparatus during variable fuel supply, an electrical signal is sent from a fuel supply control device to a flow control device of gas to be supplied into a portion where the heat exchanger of the second fluidized bed is disposed to thereby change the gas flow velocity in the portion to a range of 0 to 1.2 m/s.

By employing such operating condition as mentioned above, CaS can be oxidized into $CaSO_4$ completely and efficiently by use of the apparatus according to the present invention.

BRIEF DESCRIPTION OF THE DRAWINGS

FIG. 1A is a schematic cross-sectional view of a heat exchanger of the first embodiment.

DESCRIPTION OF THE PREFERRED EMBODIMENTS

Herebelow, the present invention will be described concretely based on embodiments shown in FIGS. 1 to 9.
(First Embodiment)

Figure 1:
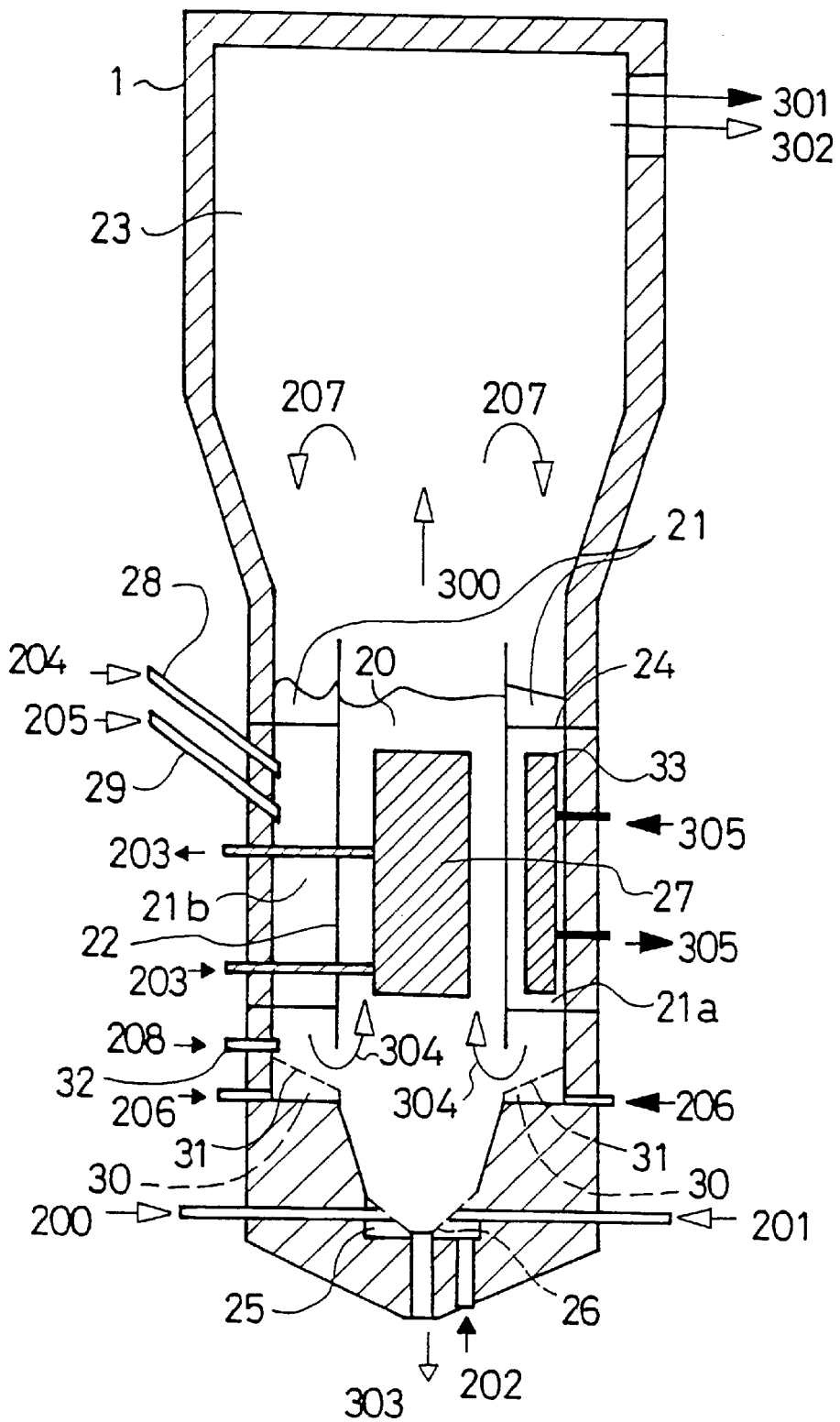
FIG. 1 is a longitudinal cross sectional view showing an apparatus of a first embodiment according to the present invention.

A first embodiment will be described with reference to FIG. 1. In FIG. 1, numeral 1 designates a CaS oxidation apparatus, and this CaS oxidation apparatus 1 has therein a partition 22 which partitions an interior of the apparatus so as to form a first fluidized bed 20 on an inner side of the partition 22 and a second fluidized bed 21 on an outer side. In an upper portion therein a space forms a space portion 23.

The partition 22 disposed between the first fluidized bed 20 and the second fluidized bed 21 is covered by a fire resistant material, is cooled by a heating medium fluid and is supported by a supporting member 24 which is cooled by a heating medium fluid flowing therein. The portion forming the second fluidized bed 21 consists of a portion 21a which has an in-bed heat exchanger 33 and a portion 21b which has no such a heat exchanger.

Within the first fluidized bed 20, there is provided a heat exchanger 27, and coal 200 and coal char 201, carried by a nitrogen-containing gas, are supplied into the first fluidized bed 20 from below the fluidized bed. Numeral 25 designates a plenum and numeral 26 designates a distributor plate. A mixture gas 202 of nitrogen, oxygen and steam is supplied through the plenum 25 and the distributor plate 26 so that the first fluidized bed 20 is formed and the fuel burns.

Upon burning of the coal 200 and the coal char 201, so supplied, a combustion surface temperature of the particle becomes high and the particles melt partially to thereby generate an agglomerated substance, called a clinker, which may worsen the fluidization. In order to prevent generation of the clinker, the gas flow velocity in the first fluidized bed 20 is set to 0.7 to 1.5 m/s at the lowermost portion of the bed. Also, in order to make the particles more easily abraded, the gas flow velocity at the upper portion of the bed where the heat exchanger 27 is disposed is set to 0.5 to 0.9 m/s.

The combustion heat is heat-exchanged by a heating medium fluid 203 flowing in the heat exchanger 27 which is disposed within the first fluidized bed 20. The heat exchanger 27 is of a coiled tube type, and between the coiled tubes there is provided a baffle plate 271 of a staggered lattice shape. The baffle plate has a surface coating applied thereto made of a material of a hardness higher than that of the fluid medium. FIG. 1A illustrates the baffle plate 271 merely for the purpose of schematically illustrating the fact that the baffle plate 271 is provided between coil tubes of the heat exchanger 27, and is otherwise not provided to indicate any specific structure or disposition of the heat exchanger 27 or baffle plate 271 except as otherwise discussed above.

In order to completely oxidize CaS contained in the particles 304 flowing from the second fluidized bed 21 through below the partition 22, the temperature of the first fluidized bed 20 is set to 870 to 1000° C. The particles which have been oxidized completely in the first fluidized bed 20 are extracted from below the bed as a discharged ash 303 or are discharged from the upper portion of the apparatus as an entrained ash 302.

A fine powder which has been completely oxidized in the second fluidized bed 21 and sent to the first fluidized bed 20 and a fine powder which has been pulverized and abraded in the first fluidized bed 20 entrain into the space portion 23 from the first fluidized bed 20 to become entrained particles 300. High temperature particles 207, which constitute a major part of the entrained particles 300, fall down along a wall surface of the space portion 23 to come into the second fluidized bed 21. The remaining portion of the entrained particles 300 are elutriated by a combustion gas 301 to become entrained ash 302 to be taken out of the apparatus.

Also, a fine powder 204 of mean particle size of 100 μm containing desulfurizing products consisting of CaS, CaO, $CaCO_3$, etc. (hereinafter referred to as "fine powder") and a coarse powder 205 of mean particle size of 300 to 2000 μm containing desulfurizing products consisting of CaS, CaO, $CaCO_3$, etc. (hereinafter referred to as "coarse powder") are supplied, together with a nitrogen-containing carrying gas, into the second fluidized bed 21 from an upper portion of the second fluidized bed 21 through nozzles 28, 29.

The fine powder 204 and the coarse powder 205, so supplied, are products produced by desulfurization in coal gasification. One example of the composition thereof is CaS 40%, $CaCO_3$ 30%, and CaO 30%. The fine powder 204 is that collected from a cyclone and the mean particle size is approximately 100 μm.

If the mean particle size of the coarse powder 205 is smaller than 300 μm, the first fluidized bed 20 will be made in a turbulent fluidized bed, which results in a narrow range of the gas flow velocity therein and less freedom of operation. If the mean particle size is larger than 2000 μm, it will become difficult to oxidize CaS completely in the first fluidized bed 20.

The second fluidized bed 21 is fluidized by a mixture gas 206 of nitrogen, oxygen and steam which has been supplied via a plenum 30 and a distributor plate 31, and its temperature is 750 to 950O.C. In the portion 21b of the second fluidized bed 21, where no in-bed heat exchanger 33 is disposed, the gas flow velocity is set to 0.05 to 1.2 m/s in order to make the entrained particles as little as possible, so that a moderate fluidized bed is formed there.

In the portion 21a of the second fluidized bed 21, where the in-bed heat exchanger 33 is disposed, the high temperature particles 207 which fall down from the space portion 23 have heat exchanged with a heating medium fluid 305 which flows in the in-bed heat exchanger 33. Control of a heat absorption rate of this oxidation apparatus is done by changing the gas flow velocity in the range of 0 to 1.2 m/s in the portion 21a of the second fluidized bed 21 where the in-bed heat exchanger 33 is disposed. If the gas flow velocity is made 0 m/s, the portion 21a of the second fluidized bed 21 where the in-bed heat exchanger 33 is disposed becomes a fixed bed and the heat transfer rate is reduced greatly.

In the second fluidized bed 21, as compared with the first fluidized bed 20, the gas flow velocity is lower and the gas contained in the fluidized bed is less, hence the specific gravity of the fluidized bed becomes larger. Thus, the particles in the second fluidized bed 21 can be supplied into the first fluidized bed 20 smoothly through the space below the partition 22.

In the first embodiment, in order to move the particles more smoothly into the first fluidized bed 20 from the second fluidized bed 21, there is provided a nozzle 32 in an outer wall portion of the second fluidized bed 21. A mixture gas 208 of nitrogen, oxygen and steam is supplied therethrough.

(Second Embodiment)

Next, a second embodiment will be described with reference to FIGS. 2 and 3. This second embodiment is an example of case where a reaction rate of CaS and oxygen is large. In the second embodiment, differently from the first embodiment, a coarse powder 205 carried by a nitrogen-containing gas is supplied into a portion 20a below a first fluidized bed 20 through a nozzle 29.

The coarse powder 205 collides with a mixture gas 202 of nitrogen, oxygen and steam which blows out of a distributor plate 26. If CaS in the coarse powder 205 is placed in a high oxygen concentration, an exothermic reaction of CaS+ 2O$_2$→CaSO$_4$ occurs very rapidly on a surface of the particle, hence the CaS particle in the coarse powder 205 supplied into the portion 20a below the first fluidized bed 20 is suddenly temperature-elevated to cause thermal stresses therein, and then becomes liable to be pulverized and abraded.

Also, if the particles in the portion 20a below the first fluidized bed 20 are slow in movement, the transfer of heat becomes worse and the surface of the particle melts partially, so that an agglomeration phenomenon, where the particles stick to each other, occurs and the operation becomes obstructed. Thus, in order to accelerate pulverization and abrasion of CaS (which has been made liable to be pulverized and abraded due to the thermal stresses) and to prevent the agglomeration phenomenon, the gas flow velocity in the portion 20a below the first fluidized bed 20 is set to 1.0 to 1.5 m/s, and a turbulent fluidized bed is formed there.

Also, in the second embodiment, differently from the first embodiment, a fine powder 204 carried by a nitrogen-containing gas is supplied swirling (FIG. 3) into a second fluidized bed 21 through a nozzle 28 so that sticking between the particles is prevented by the swirling flow. In order to form such a swirling flow, an in-bed heat exchanger 33 is disposed below the swirling flow in the second fluidized bed 21.

Figure 2:
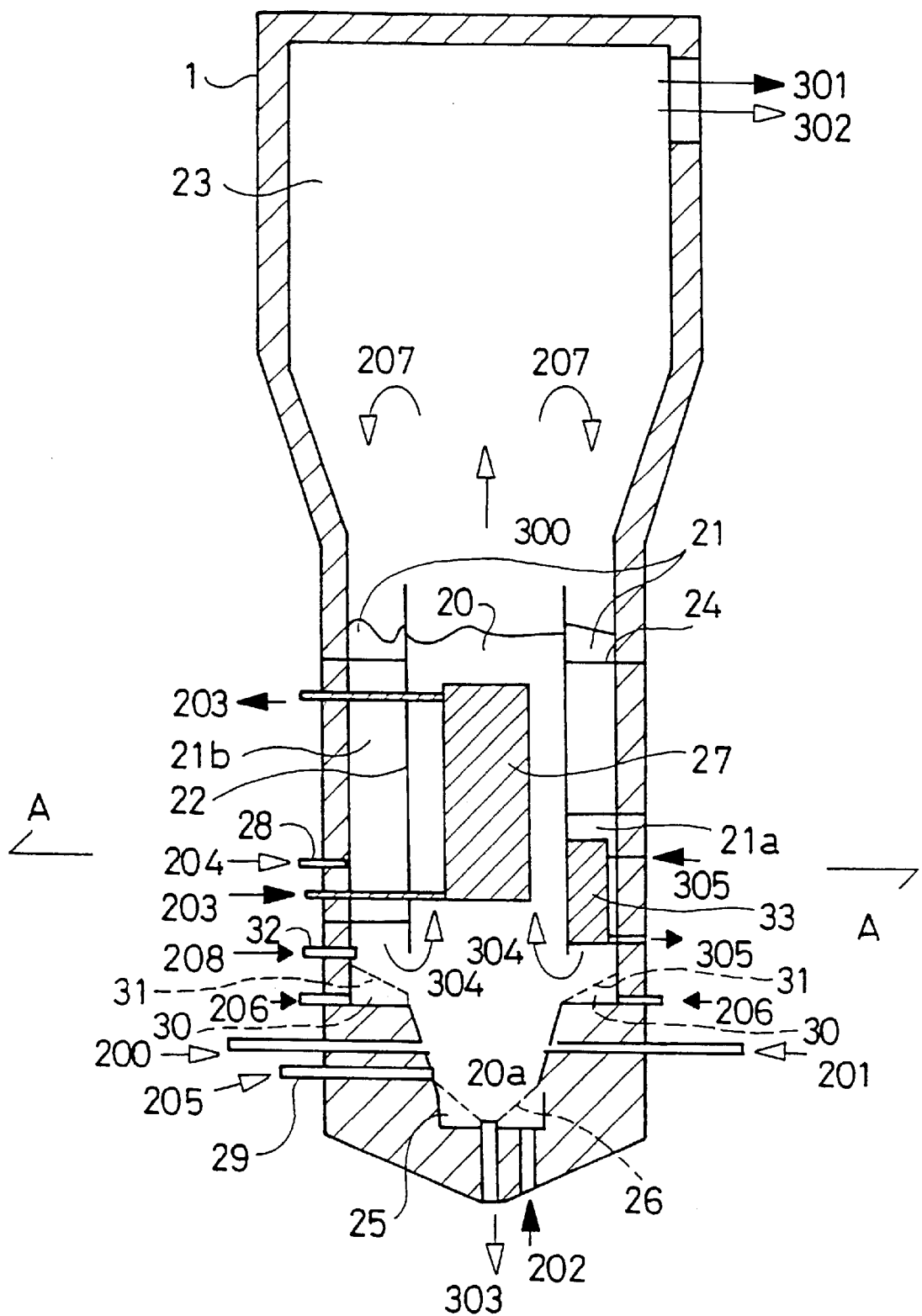
FIG. 2 is a longitudinal cross sectional view showing an apparatus of a second embodiment according to the present invention.
Figure 3:
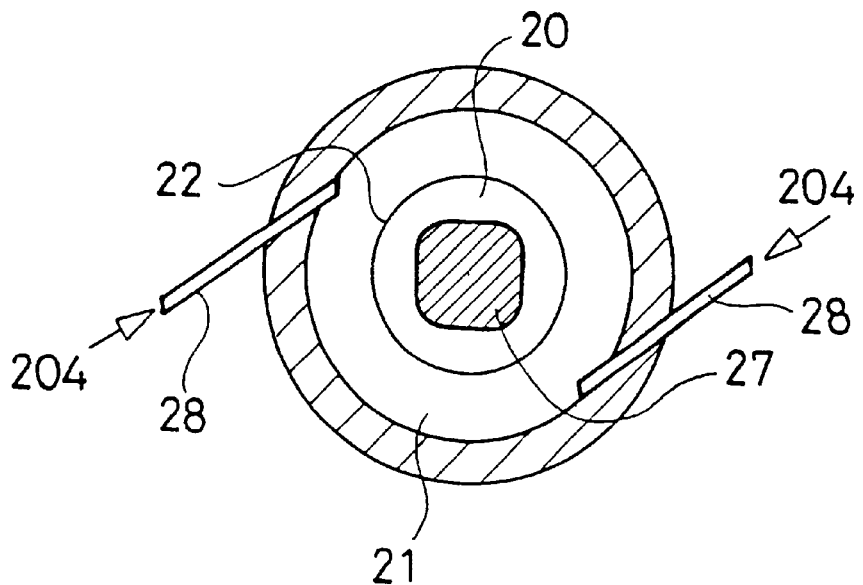
FIG. 3 is a transverse cross sectional view taken along line A—A of FIG. 2.

Construction of parts of the second embodiment shown in FIG. 2 other than those described above is the same as in the first embodiment.

(Third Embodiment)

Figure 4:
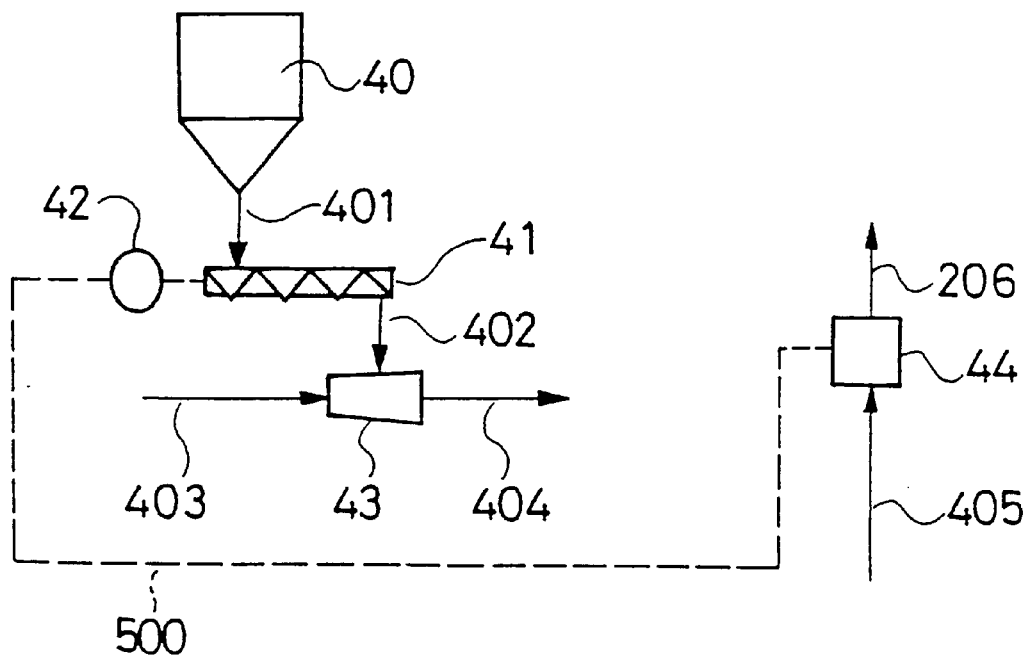
FIG. 4 is a diagrammatic view showing an apparatus of a third embodiment according to the present invention.

A third embodiment will be described with reference to FIG. 4. FIG. 4 is for explaining an operation method in a case where a supply rate of fuel, such as coal, char, etc. varies in the first and second embodiments.

In FIG. 4, fuel 401 from a fuel supply hopper 40 is extruded by a screw feeder 41. An extruded fuel 402 is sent to an injector 43 and is then carried therefrom into the first fluidized bed 20 as a fuel 404 by a nitrogen-containing gas 403.

The fuel supply rate is converted into an electrical signal 500 by a fuel supply control device 42. The electrical signal 500 is sent to a flow control device 44. The flow control device 44 controls a flow rate of a mixture gas 405 of nitrogen, oxygen and steam to be supplied. A mixture gas 206, so controlled, is supplied into the portion of the second fluidized bed 21 where the heat exchanger is disposed.

If the fuel is decreased, the mixture gas 206 is decreased and the heat transfer rate of the oxidation apparatus is decreased. If the fuel is increased, the mixture gas 206 is increased and the heat transfer rate of the oxidation apparatus is increased.

Figure 9:
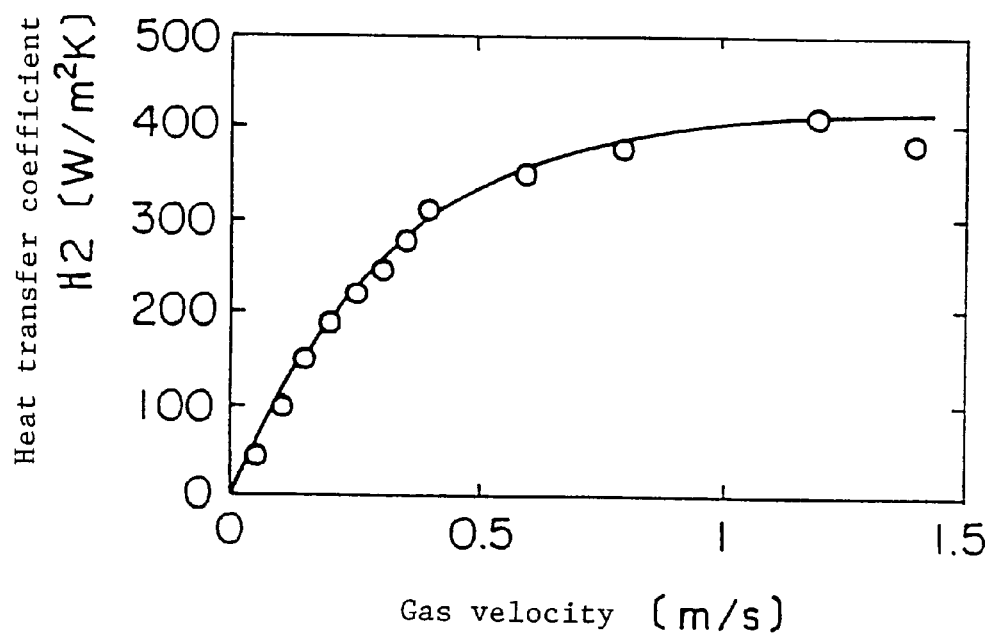
FIG. 9 is a diagram showing a relationship between gas flow velocity in a second fluidized bed and a heat transfer rate of the oxidation apparatus with respect to the third embodiment.
Figure 10:
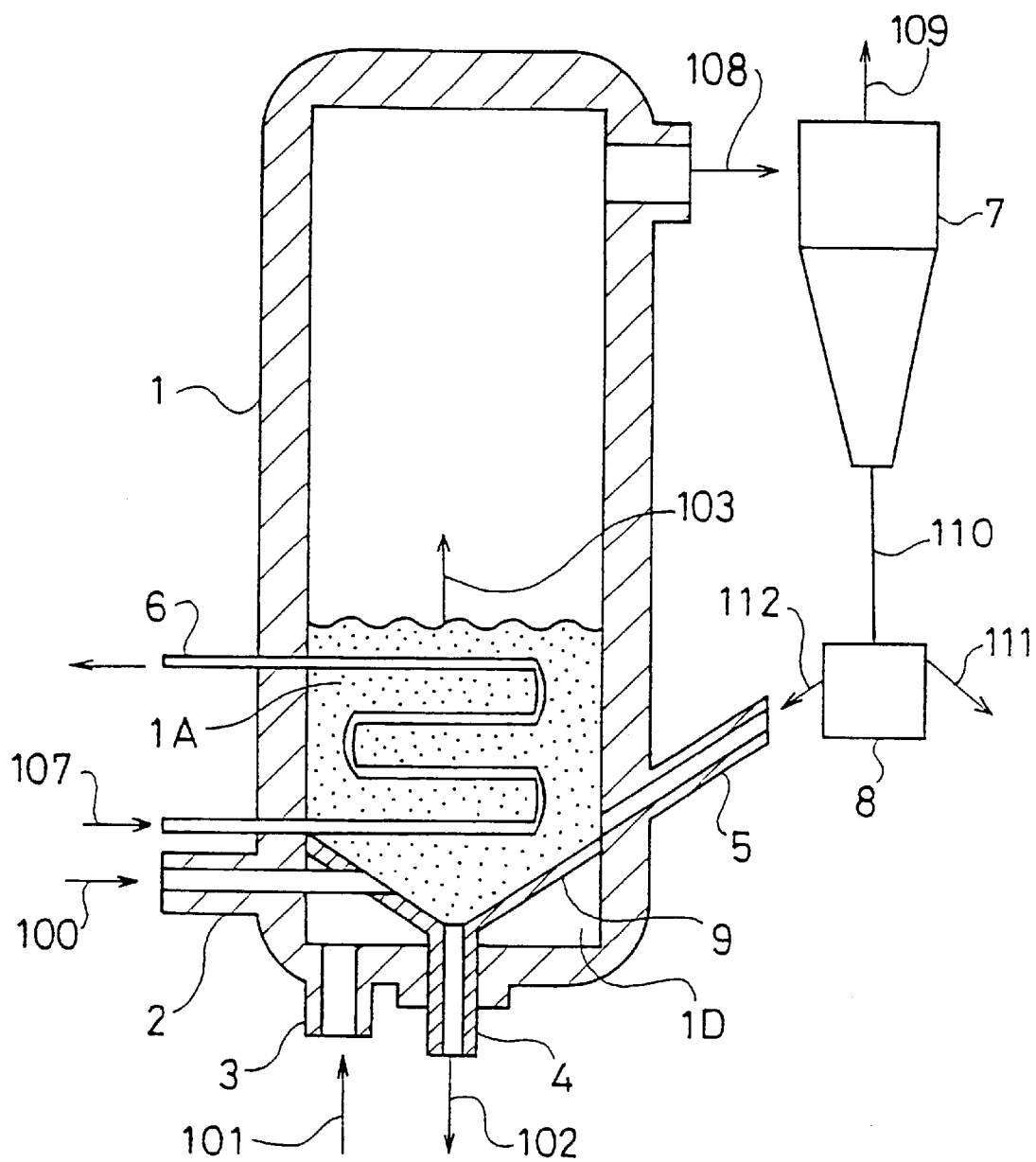
FIG. 10 is a longitudinal cross sectional view showing a prior art apparatus.

FIG. 9 shows relationship between the heat transfer coefficient and gas flow velocity in the second fluidized bed 21 of the third embodiment according to the present invention. As shown, as the gas flow velocity decreases, the heat transfer coefficient decreases. Where the heat transfer rate of the entire oxidation apparatus is Q, the heat transfer coefficient of the heat exchanger of the first fluidized bed is $H_1$, the heating area is $A_1$, the heating medium temperature is $TS_1$, the first fluidized bed temperature is $T_1$, the heat transfer coefficient of the heat exchanger of the second fluidized bed is $H_2$, the heating area is $A_2$, the heating medium temperature is $TS_2$ and the second fluidized bed temperature $T_2$, the following relationship can be obtained:

$$Q=H_2\times A_1\times(T_1-TS_1)+H_2\times A_2\times(T_2-TS_2)$$

Accordingly, if the fuel supply rate varies, the gas flow velocity in the portion of the second fluidized bed where the in-bed heat exchanger is disposed is changed so that the heat transfer rate to the heating medium is changed. It thereby becomes possible that the heat transfer rate of the entire oxidation apparatus can be changed.

(Fourth Embodiment)

Figure 5:
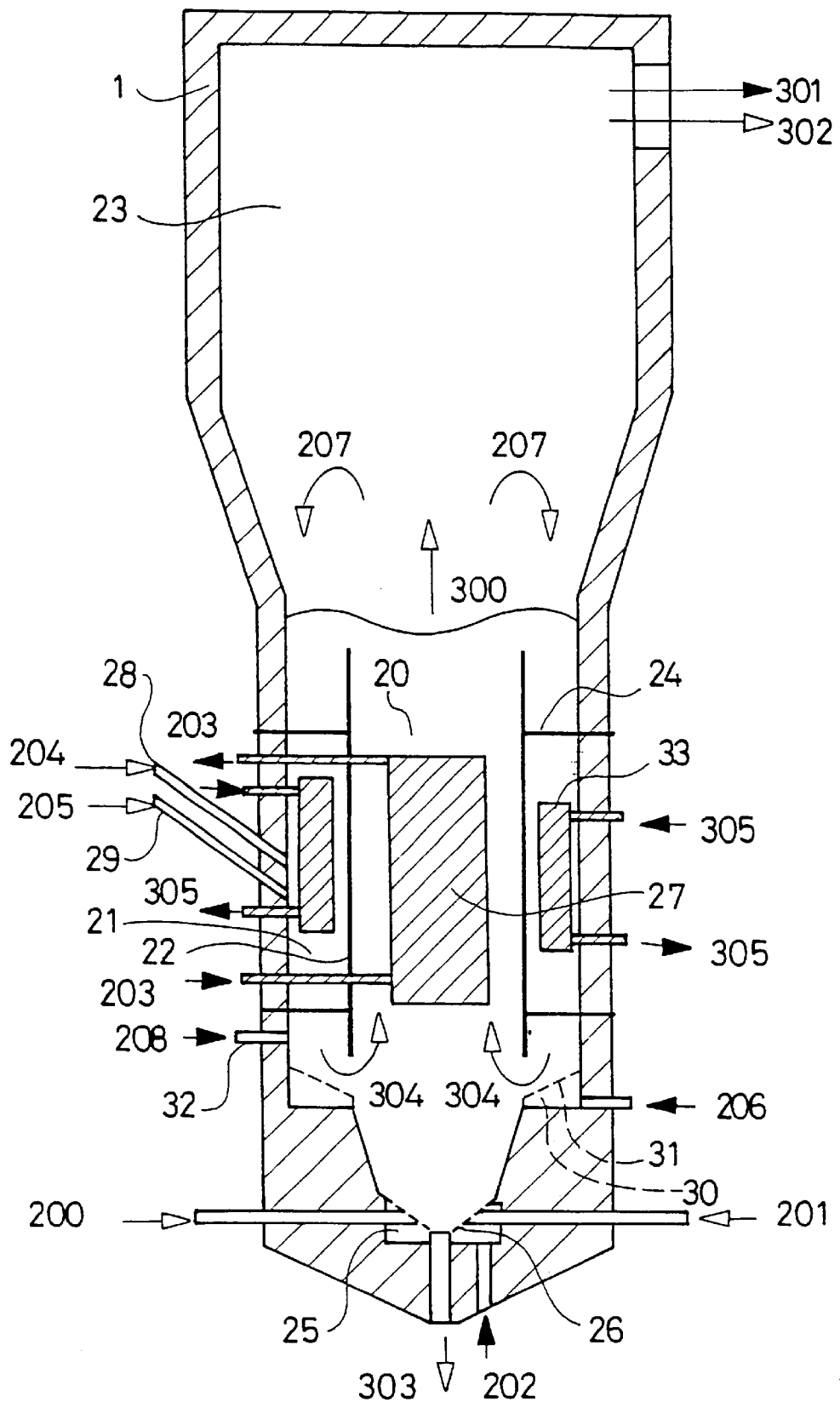
FIG. 5 is a longitudinal cross sectional view showing an apparatus of a fourth embodiment according to the present invention.

A fourth embodiment according to the present invention will be described with reference to FIG. 5. This fourth embodiment is an example of a case where a proportion of the fine powder in the supplied particles is small and it is difficult to follow a partial load. In this embodiment, the height of the fluidized bed of the first fluidized bed 20 and the second fluidized bed 21, respectively, is made higher than the partition 22 by 0 to 0.5 m, approximately. The circulation rate of particles from the first fluidized bed 20 into the second fluidized bed 21 is thereby increased.

The second fluidized bed 21 may be constructed only by the portion where the in-bed heat exchanger 33 is disposed.

Control of the circulation rate of particles is done by a differential gas flow velocity between the first fluidized bed 20 and the second fluidized bed 21. If the supply of coal 200 and char 201 varies, the gas flow velocity in the second fluidized bed 21 is changed and the circulation rate is controlled.

(Fifth Embodiment)

Figure 6:
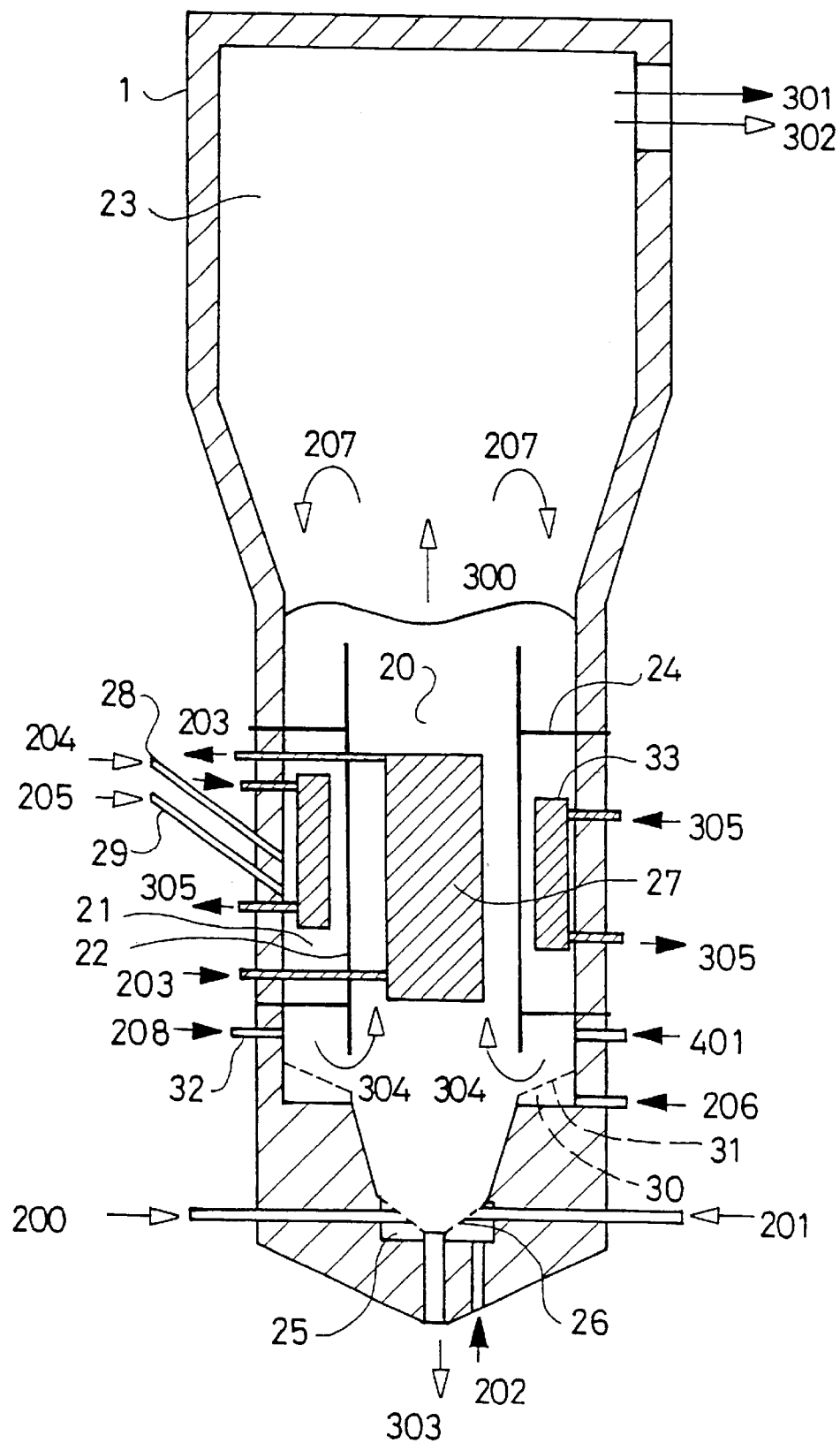
FIG. 6 is a longitudinal cross sectional view showing an apparatus of a fifth embodiment according to the present invention.

A fifth embodiment according to the present invention will be described with reference to FIG. 6. This fifth embodiment is an example of a case where the oxidation of CaS is insufficient in the fourth embodiment because of a large CaS content in the Ca compound in the supplied particles and the like.

In the fourth embodiment, the fluidized bed height of the first fluidized bed 20 and the second fluidized bed 21, respectively, is made higher than the partition 22 by 0 to 0.5 m, approximately, as mentioned above. Thus a portion of the coarse particles in the first fluidized bed 20 is also circulated into the second fluidized bed 21. In the fourth embodiment, a proportion of the fine powder in the second fluidized bed 21 becomes smaller and the residence time of the fine powder becomes less. Hence if the CaS content in the Ca compound in the supplied particles becomes 80% or more, the oxidation of CaS becomes insufficient.

Thus, in the fifth embodiment, in order to accelerate the oxidation of CaS, fuel 401 of coal, char and the like is supplied into the second fluidized bed 21 so that the second fluidized bed 21 is made in a reduction atmosphere. A portion of $CaSO_4$ on the fine powder surface and hydrogen in the reduction gas in the second fluidized bed 21 thereby make a reaction, such as $CaSO_4+H_2 \rightarrow CaO+H_2O+SO_2$, to thereby generate CaO.

As Cao has a smaller molecular volume, there are formed fine pores in the particle surface through which oxygen may spread. Thus, the fine pores are formed in the fine powder surface in the second fluidized bed 21 and oxygen spreads as far as to the interior of the fine powder in the first fluidized bed 20. Hence the fine powder is oxidized quickly.

In order to accelerate the oxidation of CaS, a reduction atmosphere may be formed in the first fluidized bed 20. In this case, nozzles for blowing a mixture gas 202 of nitrogen, oxygen and steam into the first fluidized bed 20 are distributed irregularly in the radial direction. A reduction atmospheric portion may thereby be formed in the radial direction below the first fluidized bed 20.

In the above, the invention has been described concretely based on the embodiments as illustrated, but the invention is not limited to these embodiments and may have various modifications to the concrete structure and construction within the scope of the claims as hereinafter set forth.

As described above, according to the present invention, the following effect can be obtained.

In the CaS oxidation method and apparatus according to the present invention, an oxidation apparatus is used comprising the first fluidized bed formed on the inner side, the second fluidized bed formed on the outer side of the first fluidized bed and the freeboard portion disposed above these two fluidized beds. Oxidation is effected in these two fluidized beds of the first and second beds, whereby CaS can be oxidized completely.

According to the present invention, CaS in the fine powder supplied into one of the first and second fluidized beds, the second for example, is oxidized in the second fluidized bed and sent to the other, that is, the first, fluidized bed. The fine powder which has been sent to the first fluidized bed and oxidized completely entrains from the first fluidized bed and is discharged out of the system or extracted from below the first fluidized bed.

Figure 7:
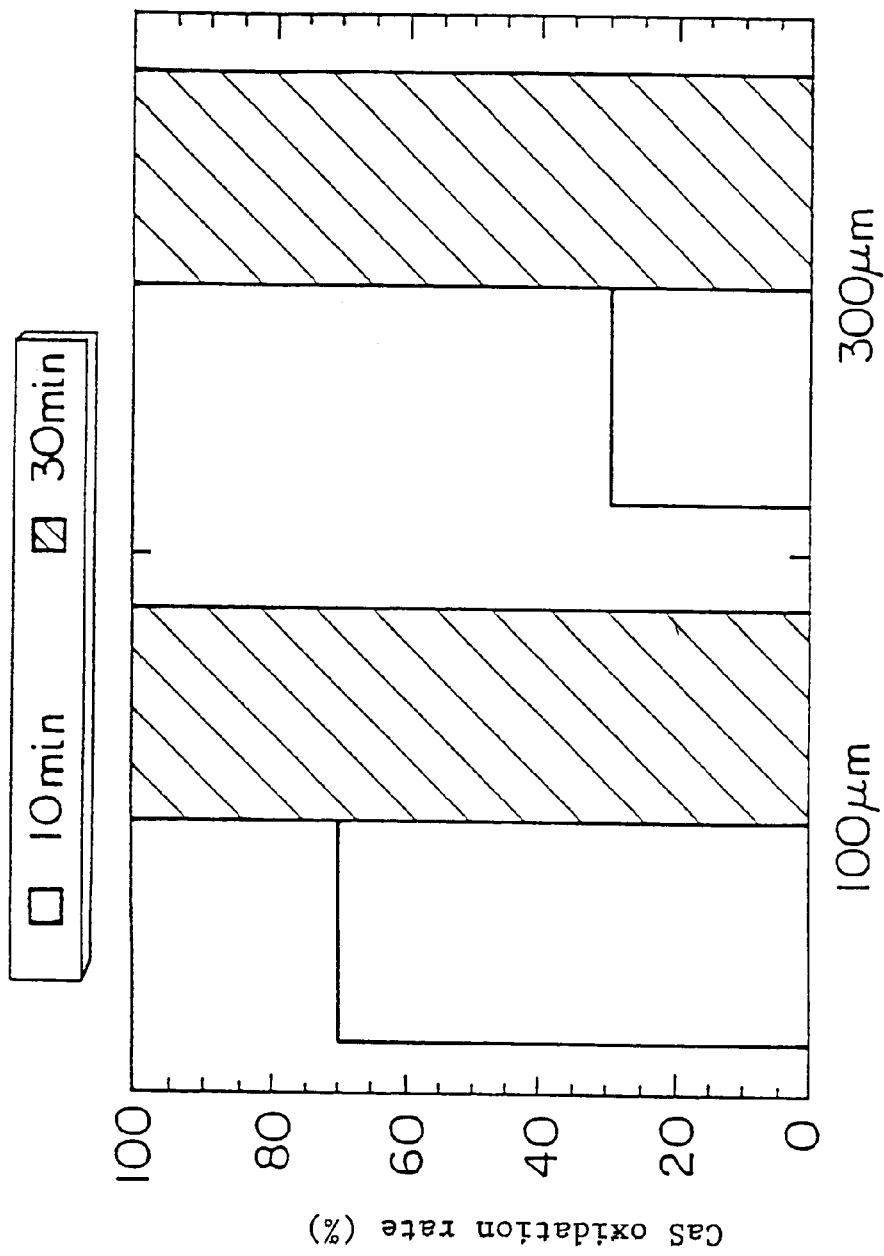
FIG. 7 is an explanatory view showing the influence of particle size and time given on CaS oxidation reaction rates in the apparatus of the first and second embodiments.

FIG. 7 shows the influence of particle size and time given on the oxidation reaction rate of CaS in the case where the particles are sent to the first fluidized bed from the second fluidized bed. In the prior art oxidation apparatus, the entraining particles of about 100 $\mu$m reside in the fluidized bed only about 10 minutes on average.

As shown in FIG. 7, a residence time of about 10 minutes can afford only an insufficient oxidation, while in the present invention, the fine powder is introduced into the second fluidized bed, for example, and thereby the average residence time becomes about 2 hours, so that it is understood that sufficient oxidation can be attained.

The coarse powder in the desulfurizing agent is supplied into the second fluidized bed to be oxidized only on the particle surfaces and is sent to the first fluidized bed, as in the first embodiment, or is directly supplied into the first fluidized bed, as in the second embodiment. The particles of the coarse powder sent to the first fluidized bed reside in the first fluidized bed as long a time as is sufficient for completion of the oxidation, and CaS of 300 $\mu$m, for example, is oxidized completely, as shown in FIG. 7.

The coarse powder, while it resides in the first fluidized bed, is moved vigorously by the gas and collides violently with other particles and with the heat exchanger and the baffle plate having no heat exchange function, both disposed in the fluidized bed. A $CaSO_4$ shell generated on the coarse powder surface is thereby pulverized and abraded, which results in that oxygen may easily spread to the interior of the particle and oxidation of CaS into $CaSO_4$ is accelerated. The coarse powder which has been oxidized completely is extracted from the first fluidized bed.

Figure 8:
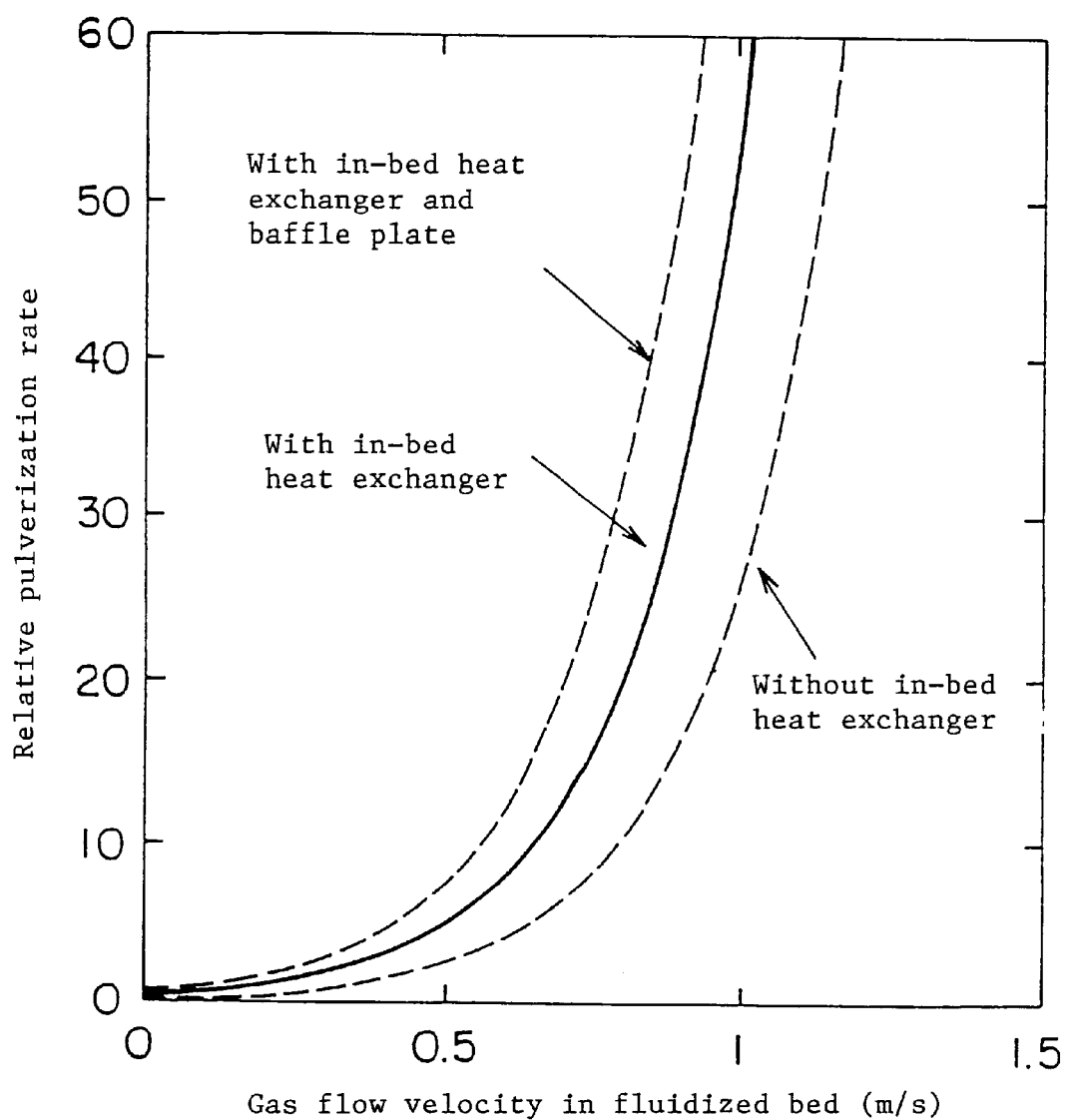
FIG. 8 is a diagram showing the influence of gas flow velocity and an in-bed heat exchanger on a CaS particle pulverization rate in the apparatus of the first and second embodiments.

FIG. 8 shows the influence of the gas flow velocity, the heat exchanger and the baffle plate on the pulverization rate of CaS particles in the first fluidized bed of the present invention. The "relative pulverization rate" of the vertical axis means a relative value of rate in which particles having particle sizes of under-pass or less per unit volume of the fluidized bed are generated.

According to the present invention, the gas flow velocity is increased and the heat exchanger and the baffle plate are disposed in the first fluidized bed, whereby the $CaSO_4$ shell on the CaS particle surface is accelerated to be pulverized and abraded in the first fluidized bed, as shown in FIG. 8. Thus, the shell of $CaSO_4$ generated on the particle surface of the CaS, which resides in the first fluidized bed, is abraded, and the oxidation reaction is made liable to occur as far as to the interior of CaS particle. At the same time the particle size of the particles residing in the first fluidized bed becomes smaller so that the time required for the oxidation becomes shorter and complete oxidation of CaS into $CaSO_4$ becomes facilitated.

As described above, according to the present invention, it has become possible to oxidize CaS into $CaSO_4$ completely, hence there is no need of discharging CaS outside the system.

What is claimed is:

1. An operating method of a CaS oxidation apparatus, comprising:

forming a first fluidized bed and a second fluidized bed on an outer side of the first fluidized bed by partially partitioning an interior of the CaS oxidation apparatus with a partition that separates an inner side of the GaS oxidation apparatus from an outer side;

establishing a space portion above the first and second fluidized beds;

receiving particles in the first fluidized bed from the second fluidized bed through an area below the partition and blowing an oxygen-containing oxidizing gas in through a nozzle to fluidize the particles;

supplying a fuel through a nozzle and burning the fuel so that CaS contained in the particles is oxidized;

pulverizing and abrading the particles in the first fluidized bed with at least one of a heat exchanger and a baffle plate in the first fluidized bed to generate a pulverized and abraded fine powder;

discharging a completely oxidized coarse powder outside of the oxidation apparatus;

supplying a desulfurizing agent into the second fluidized bed through a particle supply pipe;

fluidizing CaS-containing particles that have fallen from the space portion into the second fluidized bed and oxidizing the CaS-containing particles into $CaSO_4$ with oxygen-containing oxidizing gas;

entraining fine powder from the first fluidized bed into the space portion above the first and second fluidized beds such that a major part of the fine powder that is entrained falls down into the second fluidized bed and elutriating remaining particles with gas from the first fluidized bed and the second fluidized bed and discharging them outside of the oxidation apparatus; and controlling the temperature on the outer side of the partition with a heat exchanger disposed in one portion of the second fluidized bed, the second fluidized bed further having another portion without a heat exchanger.

2. The method of claim 1, wherein said forming establishes the first and second fluidized beds above the height of the partition.

3. The method of claim 2, wherein:

said supplying a desulfurizing agent comprises supplying a CaS-containing desulfurizing agent having a mean particle size in a range of 300 to 2000 $\mu$m;

a gas flow velocity in the first fluidized bed is controlled in a range of 0.5 to 1.5 m/s in the first fluidized bed to control particle abrasion therein;

a gas flow velocity in the second fluidized bed is set in a range of 0 to 1.2 m/s so that pulverized particles are not entrained in the gas flow and a gas flow velocity in the space portion is changed in a range of 0.1 to 0.3 m/s to control an amount that is entrained and removed from the oxidation apparatus;

a gas flow velocity in the first fluidized bed, the gas flow velocity in the second fluidized bed and the gas flow velocity in the space portion are changed to control a particle circulation rate from the first fluidized bed into the second fluidized bed; and an electrical signal is sent from a fuel supply control device, for use in said supplying a fuel, to a gas flow control device controlling a supply of gas to the one portion of the second fluidized bed so as to change a gas flow velocity in the one portion to be in a range of 0 to 1.2 m/s.

4. The method of claim 1, wherein:

said supplying a desulfurizing agent comprises supplying a CaS-containing desulfurizing agent having a mean particle size in a range of 300 to 2000 $\mu$m;

a gas flow velocity in the first fluidized bed is controlled in a range of 0.5 to 1.5 m/s in the first fluidized bed to control particle abrasion therein;

a gas flow velocity in the second fluidized bed is set in a range of 0 to 1.2 m/s so that pulverized particles are not entrained in the gas flow and a gas flow velocity in the space portion is changed in a range of 0.1 to 0.3 m/s to control an amount that is entrained and removed from the oxidation apparatus;

a gas flow velocity in the first fluidized bed, the gas flow velocity in the second fluidized bed and the gas flow velocity in the space portion are changed to control a particle circulation rate from the first fluidized bed into the second fluidized bed; and an electrical signal is sent from a fuel supply control device, for use in said supplying a fuel, to a gas flow control device controlling a supply of gas to the one portion of the second fluidized bed so as to change a gas flow velocity in the one portion to be in a range of 0 to 1.2 m/s.

* * * * *